(12) United States Patent
Syrjärinne

(10) Patent No.: US 6,865,380 B2
(45) Date of Patent: *Mar. 8, 2005

(54) METHOD, APPARATUS AND SYSTEM FOR FREQUENCY STABILIZATION USING CELLULAR SIGNAL BURSTS

(75) Inventor: Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 410 days.

This patent is subject to a terminal disclaimer.

(21) Appl. No.: 09/777,520

(22) Filed: Feb. 5, 2001

(65) Prior Publication Data

US 2002/0107030 A1 Aug. 8, 2002

(51) Int. Cl.⁷ ................................................ H04B 1/06
(52) U.S. Cl. ...................... 455/255; 455/427; 455/502; 342/357.01; 342/357.06
(58) Field of Search ............................. 455/427, 255, 455/12.1, 553.1, 188.1, 259; 342/357.02, 357.09, 357.15, 357.06, 357.12, 357.05, 356; 701/213, 215

(56) References Cited

U.S. PATENT DOCUMENTS

| | | | | |
|---|---|---|---|---|
| 4,445,118 A | | 4/1984 | Taylor et al. ................ 343/357 |
| 5,440,491 A | * | 8/1995 | Kawano et al. .............. 701/200 |
| 5,663,734 A | * | 9/1997 | Krasner .................. 342/357.12 |
| 5,663,735 A | * | 9/1997 | Eshenbach .............. 342/357.15 |
| 5,841,396 A | | 11/1998 | Krasner ........................ 342/357 |
| 6,041,222 A | * | 3/2000 | Horton et al. ............... 455/255 |
| 6,122,506 A | * | 9/2000 | Lau et al. .................... 455/427 |
| 6,178,195 B1 | | 1/2001 | Durbaraw, III et al. |
| 6,295,023 B1 | * | 9/2001 | Bloebaum .............. 342/357.06 |
| 6,356,602 B1 | * | 3/2002 | Rodal et al. ................. 375/344 |
| 6,462,708 B1 | * | 10/2002 | Tsujimoto et al. ...... 342/357.09 |
| 6,522,871 B1 | * | 2/2003 | Patrick et al. ............... 455/256 |
| 6,535,815 B2 | * | 3/2003 | Bloebaum .................... 701/213 |
| 6,678,510 B2 | * | 1/2004 | Syrjarinne et al. .......... 455/255 |
| 6,748,202 B2 | * | 6/2004 | Syrjarinne et al. .......... 455/255 |

FOREIGN PATENT DOCUMENTS

WO   WO 97/14056   * 4/1997

* cited by examiner

Primary Examiner—Charles N. Appiah
(74) Attorney, Agent, or Firm—Ware, Fressola, Van Der Sluys & Adolphson LLP

(57) ABSTRACT

A system, apparatus and corresponding method for providing a frequency reference to a user module, such as a global positioning system (GPS) receiver module. The method includes the steps of: a) having a cellular module respond to a cellular communication signal by providing a trigger pulse derived from the data component of the cellular communication signal; and b) directing the trigger pulse along a special hardware path leading from the cellular module to a user module. The special hardware path conducts the trigger pulse in such a way that the trigger pulse is provided to the user module substantially free of any significant random delays. The user module typically includes a frequency generation module that provides a stable frequency reference based on the trigger pulse. In some applications, the method also includes the step of identifying each new frame or time slot or data bit in the cellular communication signal, and the trigger pulse is provided each time a new frame or time slot or data bit, respectively, is identified.

18 Claims, 2 Drawing Sheets

METHOD, APPARATUS AND SYSTEM FOR FREQUENCY STABILIZATION USING CELLULAR SIGNAL BURSTS

FIELD OF THE INVENTION

The present invention relates to stabilizing a poor quality oscillator in a timing device, such as is used in a global positioning system (GPS) receiver, and in particular to approximately determining the carrier frequency of a GPS signal using a stabilized oscillator.

BACKGROUND OF THE INVENTION

In navigating according to signals received from GPS satellites by a GPS receiver, the signal broadcast by each satellite must first be acquired, i.e. the GPS receiver must match the phase of a replica of the code used by the satellite in order to de-spread the signal, and to do so, must also determine the carrier frequency of the signal, a frequency that is known only nominally because of shifting in the frequency due to relative motion of the satellite and the GPS receiver (the so-called Doppler shift), or because of other factors including for example a difference in the clock (essentially an oscillator) rate of the satellites compared to that of the GPS receiver.

The Doppler shift cannot be determined by a GPS receiver unless the exact time, reference location and ephemeris or almanac are known. The difference in clock rates causes what is here called a frequency error, i.e. the difference between the locally generated (by an oscillator in the GPS receiver) carrier frequency and the nominal carrier frequency. The frequency error is one part of the overall frequency shift, and must be determined to determine the Doppler shift, the other part of the overall frequency shift. The oscillator of the GPS receiver is essentially a frequency reference, and such frequency references (oscillators) are often rather low-cost oscillators, which tend to drift due to ambient temperature changes and due to aging. In practice, it is impossible to predict how much such an oscillator has drifted since last being used. Therefore, there is always an unknown frequency error when a GPS receiver is powered on.

U.S. Pat. No. 4,445,118 teaches sending a stable frequency reference to a GPS receiver to eliminate frequency errors. U.S. Pat. No. 5,841,396 teaches using a cellular carrier frequency signal (which is not stable) as such a frequency reference. U.S. Pat. No. 6,122,506 teaches using a dedicated frequency broadcast signal, and specifically the GSM Frequency Control Channel (FCCH), to eliminate frequency errors in GPS receiver. All of these ways of eliminating frequency error are based on using a carrier frequency or a corrected version of a carrier frequency, in some cases a carrier frequency derived from a cellular communication signal, and in some cases a carrier frequency provided by a special, ground-based GPS carrier reference broadcast facility.

What is therefore needed is a way of eliminating frequency error in a GPS receiver that is based on other than a carrier frequency, so as to provide a frequency reference indirectly derived from an altogether different source than in the prior art.

SUMMARY OF THE INVENTION

Accordingly, the present invention provides a system, apparatus and corresponding method for providing a frequency reference to a user module, such as a global positioning system (GPS) receiver module, the method including the steps of: a) having a cellular module respond to a cellular communication signal by providing a trigger pulse derived from the data component of the cellular communication signal; and b) directing the trigger pulse along a special hardware path leading from the cellular module to a user module; wherein the special hardware path conducts the trigger pulse in such a way that the trigger pulse is provided to the user module substantially free of any significant random delays.

In a further aspect of the invention, the user module includes a frequency generation module that provides a stable frequency reference based on the trigger pulse.

In another further aspect of the invention, the method also includes the step of identifying each new frame or time slot or data bit in the cellular communication signal, and the trigger pulse is provided each time a new frame or time slot or data bit, respectively, is identified.

In yet even another further aspect of the invention, the method also includes the step of having the user module respond to a global positioning system (GPS) satellite navigation signal and having the user module respond to the stable frequency reference by using the stable frequency reference to stabilize the operation of a local clock.

Thus, the present invention provides a hardware trigger pulse derived from a cellular communication signal as a frequency reference. The invention uses the rate of data transmission via the cellular communication signal as the basis for the frequency reference. Thus, a frequency reference is indirectly derived from a totally different source than in earlier solutions. The invention efficiently compensates for almost all internal delays enabling ~10 $\mu$s accuracy in GPS time recovery.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

According to the invention, a frequency reference for a Global Positioning System (GPS) receiver is indirectly generated from the data component of a received cellular communication signal, by for example a frame counter inside a GSM mobile phone. Although the invention will be shown and described specifically for a frequency reference generated from the data component of a received cellular communication signal, it should be understood that the invention encompasses using any aspect or component of a cellular communication signal to generate a reference frequency for a GPS receiver.

Figure 1:
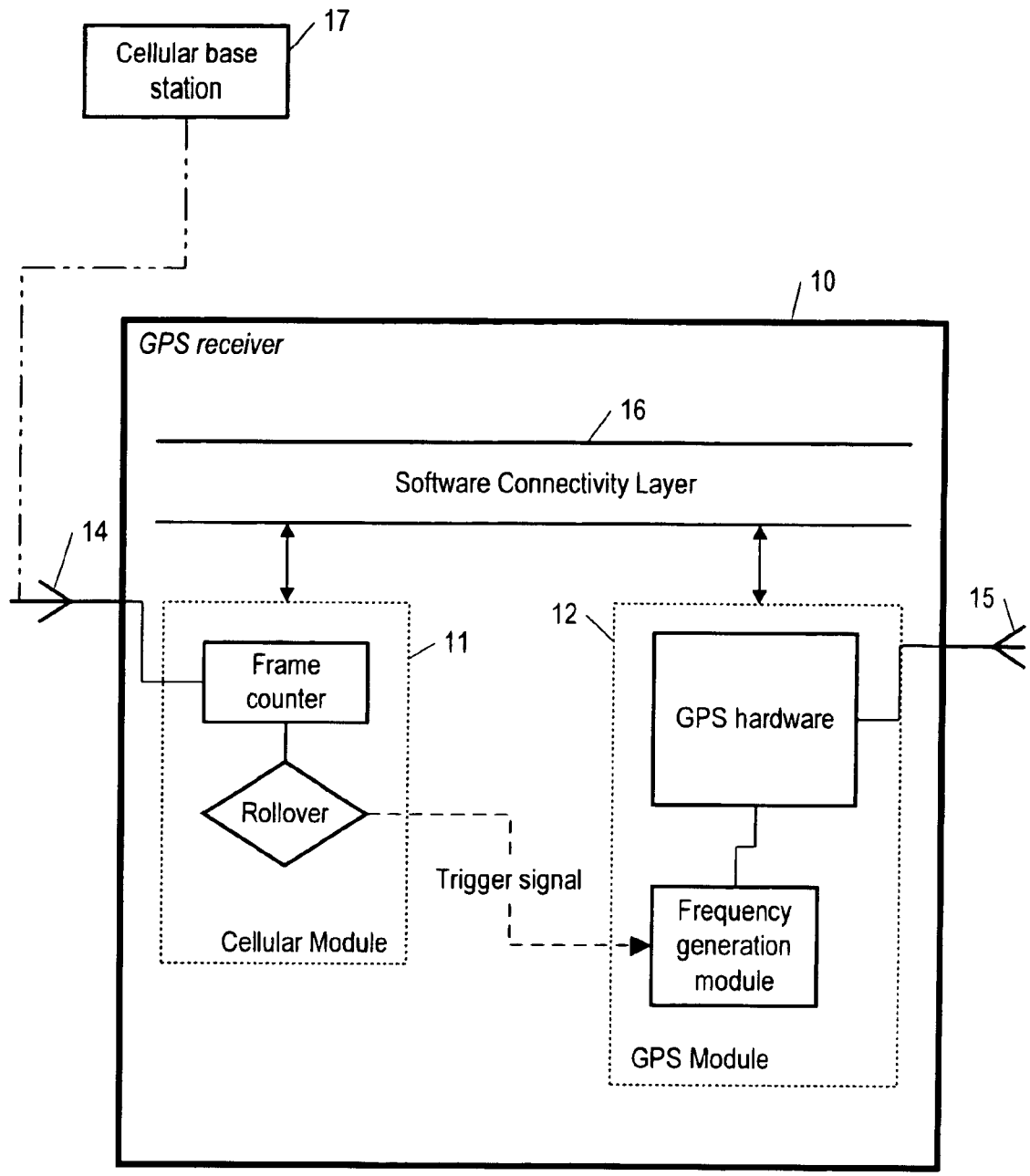
FIG. 1 is a simplified illustration of a GPS receiver including modules for providing a frequency reference according to the present invention.

Referring now to FIG. 1, a GPS receiver 10 according to the invention is shown as including a cellular module 11 (not necessarily providing a complete cellular communication capability) and a GPS module 12. The cellular module responds via a cellular antenna 14 to a cellular communication signal provided by a cellular base station 17. The GPS module responds to GPS navigation signals via a GPS antenna 15. The cellular module processes the cellular communication signal by removing the cellular carrier and extracting the data component, which consists of data organized into frames, including delimiters (headers and footers) enabling the cellular module to distinguish one frame from the next. The cellular module includes a frame counter for counting frames. The frame counter also detects the frame edges, which is used in frequency reconstruction. The frame counter is mentioned here just as an example. In GSM, there could be also a time-slot counter and a bit counter, and corresponding edge detectors as well.

The invention is also of course of use with other kinds of cellular systems, beside GSM, such as for example, time division multiple access (TDMA) systems, code division multiple access (CDMA) systems, and wideband CDMA (WCDMA). These other systems have data structures of their own, different from GSM. In general, the trigger pulse of the invention can be said to be provided to what is a user module for one or another application, a GPS receiver module being only one such application.

Also shown in FIG. 1 is a software connectivity layer 16, which is how the cellular module and the GPS module would normally communicate messages. It is shown because even though it is a means by which the trigger could be communicated, it is not suitable because a trigger sent via the software connectivity layer would encounter significant variable time delays.

The frame counter increments, e.g. from 0 to some predetermined final value of step counts, as each new frame is received. The step count is initiated when the cellular module detects the beginning of a frame.

According to the invention, every time the frame counter cycles back to zero, a trigger pulse is generated. Using a filter or a dedicated feedback loop, the trigger pulses are converted into a frequency signal, i.e. the pulses themselves are used as the frequency reference. Such a frequency reference is stable because the cellular signal is not subject to the frequency shifting phenomena that affect GPS satellite transmissions (since the cellular base stations are stationary and the motion of an earthbound GPS receiver relative to a cellular base station is negligible in its Doppler shifting of the cellular communication signal). The generated frequency is then used to measure the frequency error in the GPS module, e.g. in a GPS oscillator, i.e. it is used to measure the difference between the locally generated (GPS oscillator) frequency and the constructed (data-based) frequency.

Figure 2:
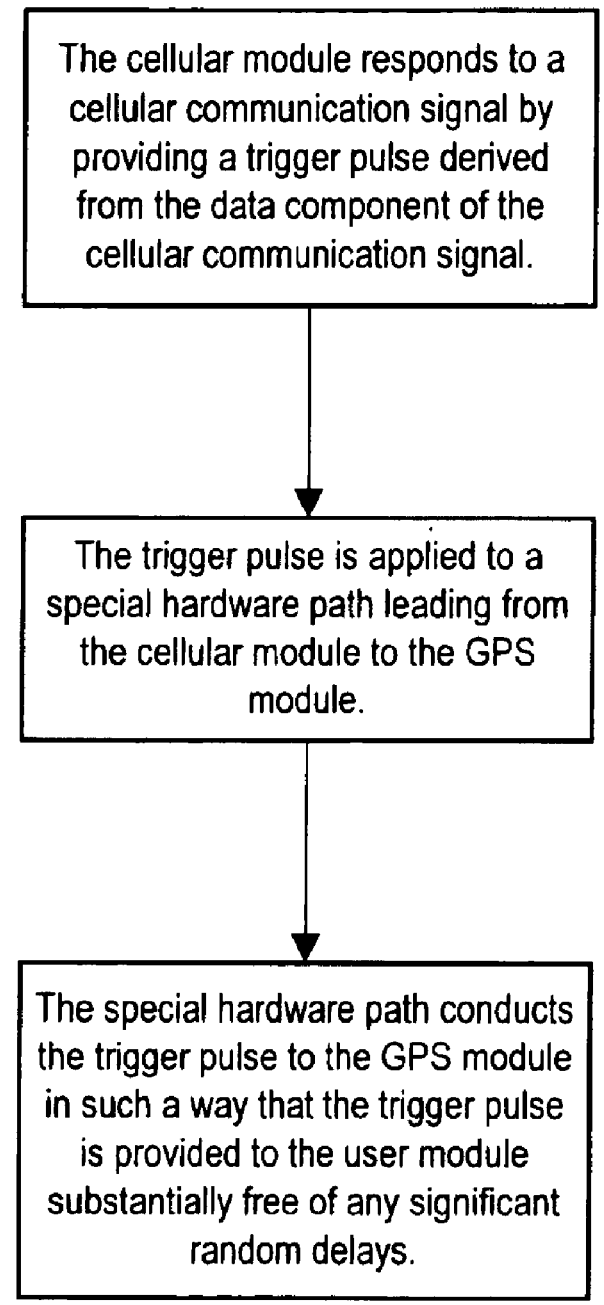
FIG. 2 is a flowchart of a method, according to the invention, for providing a frequency reference to a GPS receiver.

FIG. 2 is a flowchart showing the steps for synchronizing the GPS module of FIG. 1 to a frequency reference derived from a cellular communication signal.

One way to use the pulses in measuring the error of the local oscillator is to use the cellular-origin pulse in gating the local oscillator pulses. If the local oscillator is operating on the desired frequency, then a corresponding number of pulses would be counted/measured during one gate period, a gate period being the time between two consecutive cellular pulses. If the local oscillator is not operating at the desired frequency, then the corresponding number of pulses would not be counted during one gate period, and instead a different number would be counted, so there is an error known in terms of a difference between the number counted and the number that should be counted. This gating/counting can be repeated and filtered for a more reliable result.

Another, slightly more complex but in some applications more advantageous way to use the pulses in measuring the error of the local oscillator is to first generate a more reliable frequency reference by filtering the cellular-origin pulses, and then using the filtered frequency for gating. Filtering will reduce noise and jitter from the trigger signal, giving more accurate results.

Use of a frame counter, which would have to be provided as additional equipment, is just one way to implement the present invention, and it is the preferred embodiment in some applications, applications where having a lower frequency reference is advantageous. In case of GSM cellular communication, a frame counter can be used to generate a frequency reference of 216.68 Hz. It is also possible to generate trigger pulses at the time slot rate (there being eight time slots per frame) using a time slot counter, yielding a higher reference frequency; use of the time slot rate would give a frequency reference of 1733.4 Hz. It is possible to generate an even still higher frequency reference; using the bit rate 156.25 bits per time slot would give a frequency reference of 270844.17 Hz (i.e. using a data bit counter instead of the frame counter would in the case of a GSM cellular communication signal provide a frequency reference of 270844.17 Hz). In other cellular systems besides GSM, data rates and data structures are of course different, and the invention is not intended to be restricted to GSM cellular communication.

To implement the present invention, a typical cellular phone/GPS receiver would have to be modified to include hardware for providing the trigger pulse and software for providing the frequency generation.

Scope of the Invention

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A method, comprising the steps of:
   a) having a cellular module respond to a cellular communication signal by providing a trigger pulse derived from the data component of the cellular communication signal; and
   b) directing the trigger pulse along a special hardware path leading from the cellular module to a user module; wherein the special hardware path conducts the trigger pulse in such a way that the trigger pulse is provided to the user module substantially free of any significant random delays.

2. The method of claim 1, wherein the user module includes a frequency generation module that provides a stable frequency reference based on the trigger pulse.

3. The method of claim 1, further comprising the step of identifying each new frame in the cellular communication signal, and wherein the trigger pulse is provided each time a new frame is identified.

4. The method of claim 1, further comprising the step of identifying each new time slot in the cellular communication signal, and wherein the trigger pulse is provided each time a new time slot is identified.

5. The method of claim 1, further comprising the step of identifying each new data bit in the cellular communication signal, and wherein the trigger pulse is provided each time a new data bit is identified.

6. The method of claim 1, further comprising the step of having the user module respond to a global positioning system (GPS) satellite navigation signal and also having the user module respond to the stable frequency reference by using the stable frequency reference to stabilize the operation of a local clock.

7. An apparatus comprising:
   a) a cellular module, responsive to a cellular communication signal, for providing a trigger pulse derived from the data component of the cellular communication signal;
   b) a user module; and
   c) a special hardware path, for conducting the trigger pulse from the cellular module to the user module in such a way that the trigger pulse is provided free of any significant random delays.

8. The apparatus of claim 7, wherein the user module includes a frequency generation module that provides a stable frequency reference based on the trigger pulse.

9. The apparatus of claim 7, further comprising a frame counter, and wherein the trigger pulse is provided each time the frame counter indicates a new frame.

10. The apparatus of claim 7, further comprising a time slot counter, and wherein the trigger pulse is provided each time the time slot counter indicates a new time slot.

11. The apparatus of claim 7, further comprising a data bit counter, and wherein the trigger pulse is provided each time the data bit counter indicates a new data bit.

12. The apparatus of claim 7, wherein the apparatus is a global positioning system (GPS) receiver further comprising a GPS module including the frequency generation module, the GPS module also including a local oscillator, the GPS module responsive to the stable frequency reference and further responsive to a GPS satellite navigation signal.

13. A system comprising:
   a) a cellular base station, for providing a cellular communication signal;
   b) a cellular module, responsive to the cellular communication signal, for providing a trigger pulse derived from the data component of the cellular communication signal;
   c) a user module; and
   d) a special hardware path, for conducting the trigger pulse from the cellular module to the user module in such a way that the trigger pulse is provided free of any significant random delays.

14. The system of claim 13, wherein the user module includes a frequency generation module that provides a stable frequency reference based on the trigger pulse.

15. The system of claim 13, further comprising a frame counter, and wherein the trigger pulse is provided each time the frame counter indicates a new frame.

16. The system of claim 13, further comprising a time slot counter, and wherein the trigger pulse is provided each time the time slot counter indicates a new time slot.

17. The system of claim 13, further comprising a data bit counter, and wherein the trigger pulse is provided each time the data bit counter indicates a new data bit.

18. The system of claim 13, wherein the system is a global positioning system (GPS) receiver further comprising a GPS module including the frequency generation module, the GPS module also including a local oscillator, the GPS module responsive to the stable frequency reference and further responsive to a GPS satellite navigation signal.

* * * * *